(12) United States Patent
Giust et al.

(10) Patent No.: US 12,090,427 B2
(45) Date of Patent: Sep. 17, 2024

(54) SEWAGE TREATMENT MACHINE (71) Applicant: VEOLIA WATER TECHNOLOGIES ITALIA S.P.A. CON SOCIO UNICO, Milan (IT)

(72) Inventors: Enzo Giust, Zopoloa (IT); Davide Del Col, Padua (IT); Stefano Bortolin, Padua (IT)

(73) Assignee: VEOLIA WATER TECHNOLOGIES ITALIA S.P.A. CON SOCIO UNICO, Milan (IT)

( * ) Notice: Subject to any disclaimer, the term of this patent is extended or adjusted under 35 U.S.C. 154(b) by 181 days.

(21) Appl. No.: 17/780,320

(22) PCT Filed: Dec. 2, 2020

(86) PCT No.: PCT/IB2020/061390
§ 371 (c)(1),
(2) Date: May 26, 2022

(87) PCT Pub. No.: WO2021/111335
PCT Pub. Date: Jun. 10, 2021

(65) Prior Publication Data
US 2023/0001323 A1    Jan. 5, 2023

(30) Foreign Application Priority Data
Dec. 3, 2019  (IT) .................. 102019000022839

(51) Int. Cl.
*B01D 3/10* (2006.01)
*B01D 1/00* (2006.01)
(Continued)

(52) U.S. Cl.
CPC ............. *B01D 3/10* (2013.01); *B01D 1/0076* (2013.01); *B01D 1/0082* (2013.01); *B01D 1/225* (2013.01);
(Continued)

(58) Field of Classification Search
CPC .... B01D 1/0076; B01D 1/0082; B01D 1/225; B01D 1/305; B01D 3/007; B01D 3/10;
(Continued)

(56) References Cited

U.S. PATENT DOCUMENTS 6,010,599 A * 1/2000 Wang .................. B01D 3/007
202/205
6,076,369 A * 6/2000 Ochi .................... C02F 1/048
62/238.3

(Continued)

FOREIGN PATENT DOCUMENTS

CN    109701291 A    5/2019
JP    H0852461 A    2/1996
WO    WO-2011140289 A2 *  11/2011  ............... C09K 3/30

OTHER PUBLICATIONS

International Preliminary Report on Patentability for International Application No. PCT/IB2020/061390 mailed Mar. 4, 2022.
(Continued)

*Primary Examiner* — Jonathan Miller
(74) *Attorney, Agent, or Firm* — Dorsey & Whitney LLP (57) ABSTRACT

A sewage treatment machine comprising: a closed container inside which the liquid to be treated is brought to boil; a vacuum-generating apparatus, which is adapted to maintain the inside of the closed container at a given pressure having a value lower than the environmental/external pressure; a heat-pump assembly which is associated to the closed container so as to be able to transfer heat to the liquid present on the bottom of the closed container, thus to bring said liquid to boil, and simultaneously remove heat from the vapours that reach the top of the closed container, thus to condense the vapour and obtain a distilled liquid, and which contains a refrigerant fluid comprising one or more gases of the family of the hydrofluoroolefins in a percentage greater than 3%.

14 Claims, 3 Drawing Sheets

(51) Int. Cl.
*B01D 1/22* (2006.01)
*B01D 1/30* (2006.01)
*B01D 3/00* (2006.01)
*B01D 3/42* (2006.01)
*B01D 5/00* (2006.01)
*C02F 1/04* (2023.01)
*C02F 1/06* (2023.01)
*C02F 1/18* (2023.01)

(52) U.S. Cl.
CPC ............ *B01D 1/305* (2013.01); *B01D 3/007* (2013.01); *B01D 3/42* (2013.01); *B01D 5/006* (2013.01); *C02F 1/048* (2013.01); *C02F 1/06* (2013.01); *C02F 1/18* (2013.01); *C02F 2201/008* (2013.01); *C02F 2209/42* (2013.01)

(58) Field of Classification Search
CPC . B01D 3/42; B01D 5/006; C02F 1/048; C02F 1/06; C02F 1/18
See application file for complete search history.

(56) References Cited

U.S. PATENT DOCUMENTS

| | | | | |
|---|---|---|---|---|
| 9,719,704 | B2* | 8/2017 | Giraldo | C02F 9/00 |
| 11,083,977 | B2* | 8/2021 | Bedi | C02F 1/041 |
| 2012/0055777 | A1* | 3/2012 | Fima | B01D 3/10 |
| | | | | 202/185.1 |
| 2013/0168225 | A1* | 7/2013 | Oikimus | C02F 1/041 |
| | | | | 202/180 |
| 2015/0285539 | A1* | 10/2015 | Kopko | F25B 41/39 |
| | | | | 62/324.1 |
| 2017/0349451 | A1* | 12/2017 | Lockwood | B01D 3/007 |

OTHER PUBLICATIONS

International Search Report and Written Opinion from International Application No. PCT/IB2020/061390 mailed Apr. 8, 2021.

* cited by examiner

SEWAGE TREATMENT MACHINE

CROSS-REFERENCE TO RELATED APPLICATIONS

This patent application is a U.S. national stage of PCT International Application No. PCT/IB2020/061390 filed on Dec. 2, 2020, which claims priority from Italian patent application no. 102019000022839 filed on Dec. 3, 2019 the content of each of which is herein incorporated by reference.

TECHNICAL FIELD

The present invention relates to a sewage treatment machine.

In more detail, the present invention relates to a vacuum evaporator for the treatment of aqueous-based liquids. Use to which the following disclosure will make explicit reference without however losing in generality.

BACKGROUND ART

As is known, the vacuum evaporators are machines which are capable of concentrating, by means of evaporation at sub-atmospheric pressure, the pollutants present in the sewage water they receive at inlet, providing at outlet two distinct flows of liquid, one having a low concentration of pollutants and the other having a high concentration of pollutants.

The flow of liquid having a low concentration of pollutants is substantially devoid of pollutants, and can be reused in the production process or freely discharged in the environment.

The liquid having a high concentration of pollutants, in turn, is generally collected and treated in specific disposal plants.

The vacuum evaporators most widespread on the market are provided with a large closed container which is maintained at a pressure of less than 0.9 bar, and exploit a heat pump circuit to bring the liquid present inside the container to boil at a low temperature and to cause the resulting vapours to condense, in order to concentrate the pollutants on the fraction of liquid remaining on the bottom of the container.

Unfortunately, the heat pump circuits of the current vacuum evaporators use, as refrigerant gas, a hydrofluorocarbon (for example the R-134a gas) which, although not being toxic and although having null effect on the ozone hole, nonetheless has a very high value of the GWP index (acronym for Global Warming Potential), with the environmental issues that this entails.

DISCLOSURE OF INVENTION

Aim of the present invention is to provide a vacuum evaporator for the treatment of aqueous-based liquids, which has a lower environmental impact than that of the vacuum evaporators currently known, and which simultaneously has greater efficiency.

In compliance with these aims, according to the present invention there is provided a sewage treatment machine as defined in claim 1 and preferably, though not necessarily, in any one of the claims depending thereon.

BRIEF DESCRIPTION OF THE DRAWINGS

The present invention will now be described with reference to the accompanying drawings, which illustrate a non-limiting embodiment example thereof, wherein:

FIG. 2 is a schematic view of the sewage treatment machine illustrated in FIG. 1, with parts removed for clarity's sake; whereas

PREFERRED EMBODIMENT OF THE INVENTION

Figure 1:
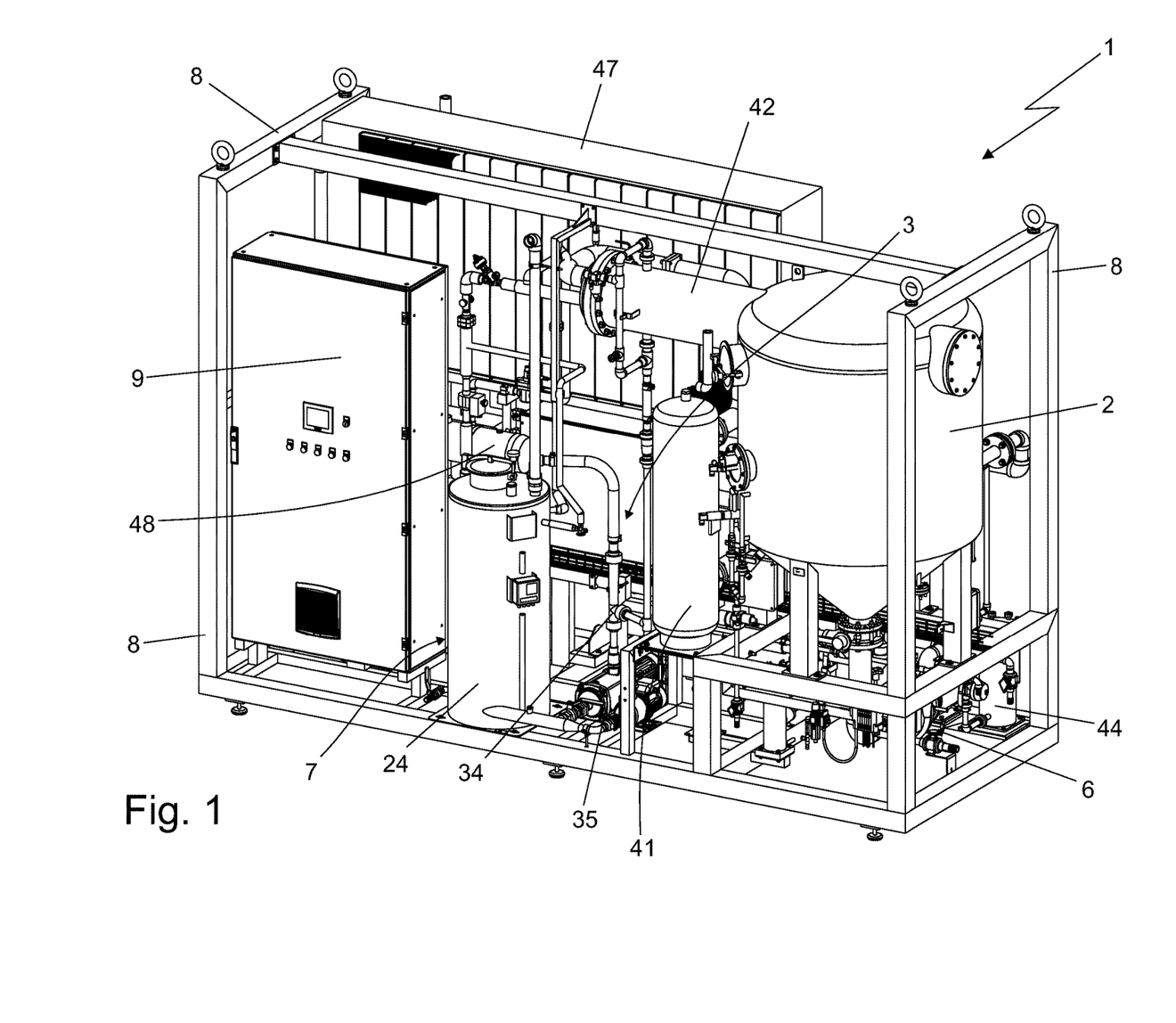
FIG. 1 is a perspective view of a sewage treatment machine realized according to the teachings of the present invention, with parts removed for clarity's sake.
Figure 2:
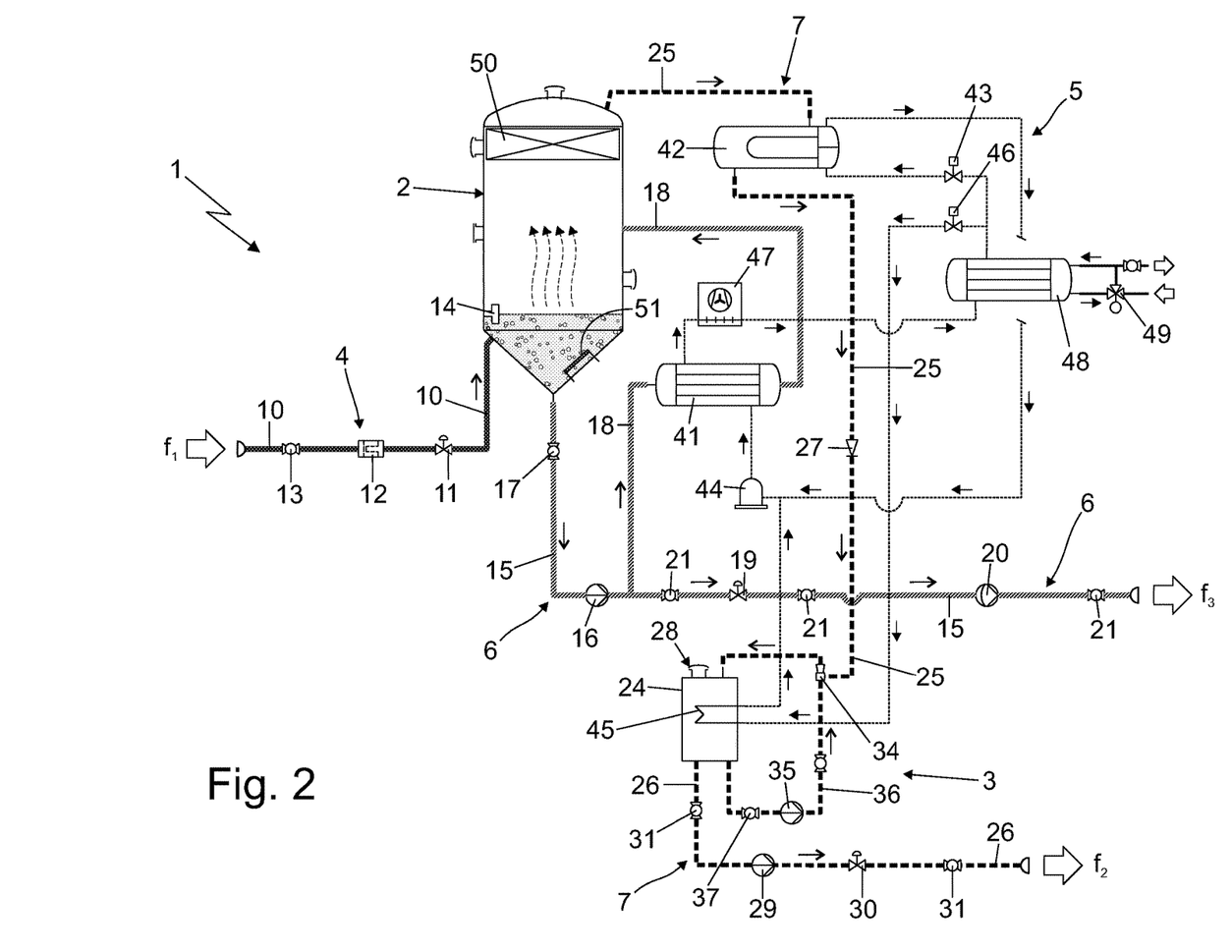

With reference to FIGS. 1 and 2, reference number 1 denotes as a whole a sewage treatment machine, which can be advantageously used for the treatment of aqueous-based liquids.

In more detail, the sewage treatment machine 1 is adapted to receive at inlet of a flow $f_1$ of sewage to be treated, and is specifically structured for concentrating, by means of evaporation at sub-atmospheric pressure, the pollutants present in the sewage at inlet, while providing at outlet, at same time, a flow $f_2$ of a distilled liquid and a flow $f_3$ of a waste liquid.

The distilled liquid is substantially devoid or anyway has a low concentration of pollutants, and can be reused in the production process or be freely discharged in the environment. The waste liquid, on the other hand, has a high concentration of pollutants, and is suitable for being collected so as to be subsequently treated in treatment plants of known type.

With reference to FIGS. 1 and 2, the sewage treatment machine 1 firstly comprises: a hermetically-sealed reactor or container 2 having a capacity preferably ranging between 100 and 7000 litres, traditionally called evaporation chamber, inside which the liquid to be treated, i.e. the sewage, is brought to boil; and a preferably electrically-operated, vacuum-generating apparatus 3 which is adapted to maintain the internal volume of the reactor/container 2 at a given pressure having a value lower than the environmental/external pressure.

In more detail, the container 2 is preferably oblong in shape, is preferably arranged in a substantially vertical position, and is preferably adapted to be filled only partially with liquid, so that the liquid to be treated accumulates on/takes up only the bottom part of container 2.

In the example shown, in particular, the container 2 preferably consists of a large watertight-closed vessel, which is preferably made of metal material and is preferably substantially cylindrical in shape.

Preferably, the bottom end of container 2, or rather of the watertight-closed vessel, moreover is approximately frusto-conical in shape.

The vacuum-generating apparatus 3, on the other hand, is preferably structured so as to continuously maintain the pressure inside the container/reactor 2 at a value lower than 0.8 bar, and optionally also lower than 0.6 bar.

In more detail, in the example shown the pressure inside the container/reactor 2 is preferably maintained at a value ranging between 3 and 8 kPA (kilopascal).

With reference to FIGS. 1 and 2, the sewage treatment machine 1 moreover comprises a supply line 4 for the liquid to be treated, which is adapted to channel the liquid to be treated, i.e. the sewage, into the reactor/container 2.

In other words, the supply line 4 is adapted to channel the sewage flow $f_1$ at inlet of container 2.

Preferably, the supply line 4 is furthermore structured so as to be able to control/vary the flow rate of the flow of liquid directed towards the container 2. In more detail, the supply line 4 is preferably adapted to control/vary the flow rate of the liquid to be treated entering into container 2, so as to continuously maintain the level of the liquid inside the container 2 in the neighbourhood of a given value.

With reference to FIGS. 1 and 2, the sewage treatment machine 1 moreover comprises a heat-pump evaporator/condenser assembly 5 which is connected/associated to the container/reactor 2 so as to be able to transfer heat to the liquid present on the bottom of container 2 thus to bring the liquid to boil, and simultaneously to remove heat from the vapours reaching the top of container 2, thus to rapidly condense the vapour and obtain the distilled liquid.

Additionally, the sewage treatment machine 1 is also provided with a first drain line 6 which branches off/departs from the bottom part of container 2, and is adapted to channel/transfer, outside of container/reactor 2, the liquid that accumulates/stagnates on the bottom of container 2; and with a second drain line 7 which branches off/departs from the upper part of container 2, and is adapted to channel/transfer, outside of container/reactor 2, the vapours that form inside the container 2 and accumulate on the top of container 2 and/or the distilled liquid resulting from the condensation of said vapours.

In more detail, the drain line 6 preferably branches off/departs from the bottom of container 2, while the drain line 7 preferably branches off/departs from the top of container 2.

Clearly, the liquid that flows along drain line 6 has a high concentration of pollutants, while the condensed vapour or liquid that flows along drain line 7 has a low concentration of pollutants.

Therefore, the flow of waste liquid $f_3$ is channelled/carried outside of machine 1 by the drain line 6, while the flow of distilled liquid $f_2$ is channelled/carried outside of machine 1 by the drain line 7.

With reference to FIG. 1, preferably the sewage treatment machine 1 is additionally provided with a rigid supporting framework 8, preferably made of metal material, which is adapted to stably rest on and optionally be anchored to the ground. The container 2, the vacuum-generating apparatus 3, the supply line 4, the heat-pump evaporator/condenser assembly 5, and the two drain lines 6 and 7 are preferably stably fixed to/placed onto the rigid supporting framework 8, so as to form an easily transportable single block.

In the example shown, in particular, the rigid supporting framework 8 preferably has a cage-like structure and/or is substantially parallelepiped in shape, and is preferably formed by metal bars butt fixed to one another.

With reference to FIG. 1, preferably the sewage treatment machine 1 finally includes an electronic control device 9 that controls the various components of the container 2, and/or of the vacuum-generating apparatus 3, of the supply line 4, and/or of the heat-pump evaporator/condenser assembly 5, and/or of the two drain lines 6 and 7, and preferably is stably fixed to/placed onto the rigid supporting framework 8.

With reference to FIG. 2, in the example shown, in particular, the supply line 4 preferably comprises: a pipe 10 connecting the inlet mouth of machine 1 to the container 2, so as to channel the liquid to be treated, i.e. the sewage, at inlet of container 2; a regulating valve 11 with controlled opening and closing, which is located along pipe 10 and is adapted to regulate the flow of the liquid directed towards the container 2; and preferably also a filter 12 which is located along the pipe 10, preferably upstream of regulating valve 11, and is adapted to block the solid particles exceeding a given size.

In more detail, the filter 12 is preferably structured so as to retain the solid particles having particle size greater than 800-1000 μm (micrometres), or even greater than 500 μm (micrometres).

Therefore, the liquid to be treated is sucked into the container 2 by negative pressure, without the use of a supply pump.

Optionally, the supply line 4 additionally comprises a manually-operated shut-off valve 13, which is placed along pipe 10, upstream of control valve 11 and/or of filter 12.

Preferably, the supply line 4 additionally includes a level sensor or switch 14 which is preferably located inside the container 2, and is adapted to detect or switch when the level of the liquid inside the container 2 reaches or exceeds a maximum given value.

The regulating valve 11, in turn, is preferably adapted to open and close based on the signals arriving from the level sensor or switch 14.

In more detail, the regulating valve 11 is preferably controlled by the electronic control device 9 based on the signals arriving from the level sensor or switch 14 and on other operating parameters of the machine 1.

The drain line 6, instead, preferably comprises: a main pipe 15 that branches off/departs from the bottom of the container 2 and ends at a first outlet mouth of the machine 1; and a preferably electrically-operated, suction pump 16 which is located along pipe 15 and is adapted to suck, from container 2, the liquid that accumulates/stagnates on the bottom of container 2, i.e. the liquid with a high concentration of pollutants, and then to pump the same liquid towards the outlet mouth.

In the example shown, in particular, the suction pump 16 is preferably a centrifugal pump.

Optionally, the drain line 6 additionally comprises a manually-operated shut-off valve 17, which is located along pipe 15, upstream of the circulation pump 16, i.e. between suction pump 16 and container 2.

The shut-off valve 17 allows to isolate the container 2, so as to conduct possible maintenance operations on suction pump 16 without compromising the vacuum-seal of container 2.

Preferably, the drain line 6 additionally comprises: a recirculation pipe 18 that branches off from main pipe 15, downstream of suction pump 16, and returns into the container 2 preferably connecting to the latter at a given height from the bottom of the same; and a regulating valve 19 with controlled opening and closing, which is located along main pipe 15, downstream of the branch of recirculation pipe 18, and is adapted to regulate/control the flow of the liquid along the end section of main pipe 15.

Preferably, the suction pump 16 is additionally adapted to cause the liquid to continuously circulate along the closed ring formed by the recirculation pipe 18 and by the container 2.

Therefore, by opening and closing the regulating valve 19, it is possible to direct or not the liquid arriving from the bottom of container 2, towards the first outlet mouth of machine 1.

Preferably, the recirculation pipe moreover connects to the container 2, above the free surface of the liquid that accumulates/stagnates on the bottom of container 2, i.e. above the maximum level reachable by the liquid inside the container 2.

Additionally, the drain line 6 preferably also comprises a delivery pump 20 preferably electrically-operated and preferably of volumetric type, which is located along the end section of main pipe 15, i.e. downstream of the branch of recirculation pipe 18 and of regulating valve 19, if present, and is adapted to pump the liquid having a high concentration of pollutants arriving from the suction pump 16, towards the first outlet mouth of the machine and with a given pressure.

In the example shown, in particular, the delivery pump 20 is preferably a diaphragm pump.

Optionally, the drain line 6 additionally comprises one or more manually-operated shut-off valves 21 that are located along the end section of main pipe 15, preferably interposed between the shut-off valve 19 and the delivery pump 20.

The shut-off valve(s) 21 allow to isolate single sections of main pipe 15, so as to be able to perform possible maintenance operations on the regulating valve 19 and/or on the delivery pump 20 without compromising the vacuum-seal of the container 2.

Preferably, the electronic control device 9 is adapted to control the suction pump 16, the regulating valve 19 and the delivery pump 20, if present, based on some operating parameters of the machine 1 and/or based on the signals arriving from one or more sensors (for example temperature sensors and/or level sensors) located on the bottom of container 2.

With reference to FIG. 2, the drain line 7, in turn, preferably comprises: a small tank 24 which has a nominal capacity preferably ranging between 1 and 500 litres, and is adapted to contain the distilled liquid and/or the vapour arriving from the top of container 2; a first pipe 25 connecting the tank 24 to the top of container/reactor 2; and a second pipe 26 connecting the tank 24 to a second outlet mouth of machine 1.

In the example shown, in particular, the tank 24 is preferably a substantially hermetically sealed container.

Preferably, the drain line 7 furthermore comprises a check valve 27 and/or a non-condensable gas discharge device 28. The check valve 27 is located along the pipe 25, and is oriented so as to prevent the distilled liquid and/or the vapour from returning towards the container 2. The non-condensable gas discharge device 28 is preferably placed on the top of tank 24, and is adapted to evacuate/discharge, outside of tank 24, the non-condensable gases present in the tank 24.

In the example shown, in particular, the non-condensable gas discharge device 28 is structured to automatically evacuate/discharge the non-condensable gases outside of the tank 24.

Additionally, the drain line 7 preferably comprises, along the pipe 26: a preferably electrically operated, suction pump 29 which is adapted to suck the distilled liquid from tank 24 and to send said liquid to the second outlet mouth of the machine with a given pressure; and preferably also a regulating valve 30 with controlled opening and closing, which is preferably located downstream of suction pump 29, and is adapted to regulate/control the flow of the distilled liquid towards the second outlet mouth of the machine.

The distilled liquid is thus discharged outside of the machine 1 actuating the suction pump 29 and the regulating valve 30 simultaneously.

In the example shown, in particular, the suction pump 29 is preferably a centrifugal pump.

Optionally, the drain line 7 additionally comprises one or more manually-operated shut-off valves 3 that are located along pipe 26, preferably upstream of suction pump 29 and downstream of regulating valve 30.

The shut-off valve(s) 31 allow to isolate the pipe 26, so as to perform possible maintenance operations on the suction pump 29 and/or on the regulating valve 30.

Preferably, the electronic control device 9 is adapted to control, if present, the suction pump 29 and the regulating valve 30 based on the signals arriving from one or more level sensors located inside the tank 24 and/or based on one or more flow rate sensors located along pipe 26 and/or based on some operating parameters of machine 1.

With reference to FIG. 2, the vacuum-generating apparatus 3, in turn, is preferably connected directly to the drain line 7 so as to exploit the distilled liquid produced by the container 2 for maintaining the container 2 in negative pressure.

In other words, the vacuum-generating apparatus 3 uses, as working fluid, the distilled liquid and/or the vapour produced by the container 2.

In more detail, in the example shown, the vacuum-generating apparatus 3 preferably comprises: an ejector 34 which is located along pipe 25, immediately upstream of tank 24 (i.e. it is located between the tank 24 and the check valve 27); and a circulation pump 35 preferably electrically actuated and preferably of centrifugal type, which is located along a recirculation pipe 36 directly connecting the tank 24 to the ejector 34.

The circulation pump 35 sucks the distilled liquid or vapour from tank 24 and channels it to the ejector 34 so that the latter sucks, by negative pressure (Venturi effect), also the distilled liquid and/or the vapour present along the pipe 25.

Optionally the vacuum-generating apparatus 3 moreover comprises one or more manually-operated shut-off valves 37 that are located along the recirculation pipe 36, upstream and/or downstream of the circulation pump 35.

The shut-off valve(s) 37 allow to isolate the recirculation pipe 36, so as to perform possible maintenance operations on the circulation pump 35.

Preferably, the electronic control device 9 is adapted to command the circulation pump 35 based on the signals arriving from one or more level sensors located inside the tank 24 and/or based on the signals arriving from one or more pressure sensors located inside the container 2 and/or based on some operating parameters of machine 1.

With reference to FIGS. 1 and 2, the heat-pump evaporator/condenser assembly 5 on the other hand comprises: a first heat-exchanger 41, traditionally called high-pressure heat-exchanger or condenser, which is adapted to heat the liquid that stagnates on the bottom of the container 2, and is preferably located along the recirculation pipe 18 of drain line 6, so as to rapidly heat up the liquid with a high concentration of pollutants that reenters into the container 2; a second heat-exchanger 42, traditionally called low-pressure heat-exchanger or evaporator, which is adapted to cool down/condense the vapour that forms inside the container 2, and is preferably located along, or at inlet of, drain line 7 so as to rapidly cool down and preferably also at least partly condense the vapour coming out of the container 2; and a preferably electronically-controlled expansion valve 43 which is interposed between the outlet of the high-pressure heat-exchanger 41 and the inlet of the low-pressure heat-exchanger 42, and is adapted to cause the rapid and irreversible expansion of the gaseous-state refrigerant fluid that flows from the outlet of heat-exchanger 41 towards the inlet of heat-exchanger 42, so that the refrigerant fluid entering the heat-exchanger 42 has pressure and temperature sensibly lower than those of the refrigerant fluid leaving the heat-exchanger 41.

Clearly, the expansion valve 43 can be replaced by a capillary tube or by other active or passive expansion member.

The heat-pump evaporator/condenser assembly 5 moreover comprises a preferably electrically-operated, compressor 44 which is interposed between the heat-exchangers 41 and 42, and is adapted to compress the refrigerant fluid leaving the heat-exchanger 42 and entering/returning into the heat-exchanger 41.

In more detail, compressor 44 is preferably a volumetric compressor, and is interposed between the outlet of the low-pressure heat-exchanger 42 and the inlet of the high-pressure heat-exchanger 41, so as to increase pressure and temperature of the refrigerant fluid directed towards the heat-exchanger 41.

In the example shown, in particular, the low-pressure heat-exchanger 42 is preferably located along the pipe 25 of drain line 7, immediately downstream of the container 2.

Furthermore, preferably the low-pressure heat-exchanger 42 is at least partially housed/inserted inside the container 2, at the top of the latter, so as to form the initial section of the drain line 7.

Preferably, the heat-pump evaporator/condenser assembly 5 moreover comprises a second low-pressure heat-exchanger 45, traditionally called auxiliary evaporator, which is located inside the tank 24 of drain line 7, so as to be able to cool down the distilled liquid and/or the vapour which is inside the same tank 24.

In more detail, the heat-exchanger 45 is preferably connected in parallel to the low-pressure heat-exchanger 42, and the heat-pump evaporator/condenser assembly 5 preferably additionally includes a second expansion valve 46 or other active or passive expansion member, which is located upstream of the inlet of heat-exchanger 45, and is adapted to cause the rapid and irreversible expansion of the gaseous-state refrigerant fluid that flows from the outlet of heat-exchanger 41 directed towards the inlet of heat-exchanger 45, so that the refrigerant fluid entering the heat-exchanger 45 has pressure and temperature sensibly lower than those of the refrigerant fluid leaving the heat-exchanger 41.

Clearly, also the outlet of the second low-pressure heat-exchanger 45 is connected to the suction of compressor 44.

Preferably, the electronic control device 9 is adapted to also command the compressor 44 and optionally the expansion valve 43 and, if present, the expansion valve 46, based on some operating parameters of machine 1 and/or based on the signals arriving from one or more pressure sensors located on the delivery and/or on the suction of compressor 44.

Alternatively, the expansion valve 43 may be controlled by an autonomous mechanical or electronic system. In addition, the valve 46, if present, may be an autonomous thermostatic valve.

Optionally, the evaporator/condenser assembly 5 moreover comprises also an auxiliary heat-exchanger 47, preferably of the finned-pack type, which is located immediately downstream of the high-pressure heat-exchanger 41, and is adapted to complete the condensation of the refrigerant fluid transferring the heat in excess to the external environment.

In addition or alternatively to the auxiliary heat-exchanger 47, the evaporator/condenser assembly 5 moreover comprises a second auxiliary heat-exchanger 48 that is located immediately upstream of expansion valve 43 and, if present, also of expansion valve 46, and is adapted to further cool down the gaseous-state refrigerant fluid directed towards the expansion valve(s) 43 and 46.

In more detail, the auxiliary heat-exchanger 48 is preferably connected to an external hydraulic circuit, so as to be crossed, at same time, by the refrigerant fluid arriving from the heat-exchanger 41 and by a low-temperature heat-transfer fluid arriving from the external hydraulic circuit, so as to remove heat from the refrigerant fluid directed towards the expansion valve(s) 43 and 46.

Preferably, the circulation of the low-temperature heat-transfer fluid circulating in the auxiliary heat-exchanger 48 can be regulated.

In even more detail, in the example shown, the auxiliary heat-exchanger 48 is connected to the external hydraulic circuit by means of a preferably electrically-operated, controlled-switching three-way valve 49 which is selectively adapted to channel the heat-transfer fluid to the inlet of the auxiliary heat-exchanger 47.

Preferably, the electronic control device 9 is also adapted to control the valve(s) that regulate the circulation of the low-temperature heat-transfer fluid inside the auxiliary heat-exchanger 48, if present.

The refrigerant fluid contained inside the heat-pump evaporator/condenser assembly 5 (i.e. the gas which the compressor 44 circulates inside the heat-exchangers 41 and 42 and optionally inside the heat-exchangers 45 and/or 47), in turn, comprises one or more gases of the family of the hydrofluoroolefins in a percentage greater than 3%.

Preferably, the gas(es) of the family of the hydrofluoro-olefins furthermore are the components of the refrigerant fluid in greater quantity/percentage.

In more detail, the refrigerant fluid preferably comprises one or more gases of the family of the hydrofluoro-olefins in a percentage greater than 30%, and optionally also greater than 50%.

Optionally, the refrigerant fluid can also comprise one or more gases of the family of the hydrofluorocarbons, preferably in a percentage lower than 50%.

In even more detail, in the example shown the refrigerant fluid contained in the heat-pump evaporator/condenser assembly 5 preferably comprises one or more gases of the family of the hydrofluoroolefins in a percentage greater than 75%.

In other words, the refrigerant fluid is preferably mainly composed of one or more gases of the family of the hydrofluoroolefins.

With reference to the sole FIG. 2, preferably the sewage treatment machine 1 finally includes: a separator/demister filter 50 which is located inside the container 2, beneath the entrance of drain line 7, and is adapted to prevent any drops of liquid dragged upwards by the current of the vapour from reaching the entrance of drain line 7; and/or a resistor 51 that is located on the bottom of container 2 and is adapted to selectively heat the liquid present inside the container 2 in addition or alternatively to the evaporator/condenser assembly 5.

Clearly, the resistor 51 can be replaced by any other electric device that produces heat when traversed by electric current.

In the example shown, in particular, the separator/demister filter 50 is preferably placed inside the container 2, immediately beneath the heat-exchanger 42.

Preferably, the electronic control device 9 is adapted to also command the resistor 51 or the like based on the signals arriving from one or more temperature signals located inside the container 2, and/or based on some operating parameters of machine 1.

Operating of the sewage treatment machine 1 is easily inferable from what described above.

The liquid to be treated is sucked into the reactor/container 2 by effect of the negative pressure created by the vacuum-generating apparatus 3, without the use of a supply pump.

The suction pump 16 sucks the liquid from the bottom of container 2 and sends it to the heat-exchanger 41 of the evaporator/condenser assembly 5, which provides the heat necessary for the evaporation of the liquid.

After crossing the heat-exchanger 41, the liquid to be treated re-enters the container 2 where, by effect of the sub-atmospheric pressure, a part of the liquid evaporates instantly (flash evaporation) and directs towards the upper part of container 2.

While moving upwards along the container 2, the water vapour crosses the separator filter 50 which retains the larger drops, and then reaches the low-pressure heat-exchanger 42 which causes the total or partial condensation of the vapour at inlet of or along the drain line 7. The resulting condensed/distilled liquid accumulates inside the tank 24, and is channelled outside of the machine following the activation of suction pump 29 and the simultaneous opening of regulating valve 30.

The non-condensable gases present inside the tank 24, on the other hand, are evacuated from tank 4 by means of the non-condensable gas discharge device 28.

Obviously, due to the evaporation of a part of the aqueous base, the liquid remaining on the bottom of container 2 progressively increases the concentration of pollutants, up to when it is discharged/channelled outside of the machine following the opening of regulating valve 19 and the activation of delivery pump 20.

The advantages connected to the use of the new refrigerant fluid comprising one or more gases of the family of the hydrofluoroolefins in a percentage greater than 3%, and more conveniently greater than 30%, are remarkable.

Experimental tests have highlighted that the new refrigerant fluid increases the efficiency of the heat-pump evaporator/condenser assembly 5 and simultaneously lowers the value of the GWP index of the machine.

It is finally clear that changes and variations may be made to the above-described sewage treatment machine 1 without however departing from the scope of the present invention.

For example, the non-condensable gas discharge device 28 may be structured so to discharge on command the non-condensable gases outside of tank 24. In this case, the electronic control device 9 may also command the non-condensable gas discharge device 28.

Figure 3:
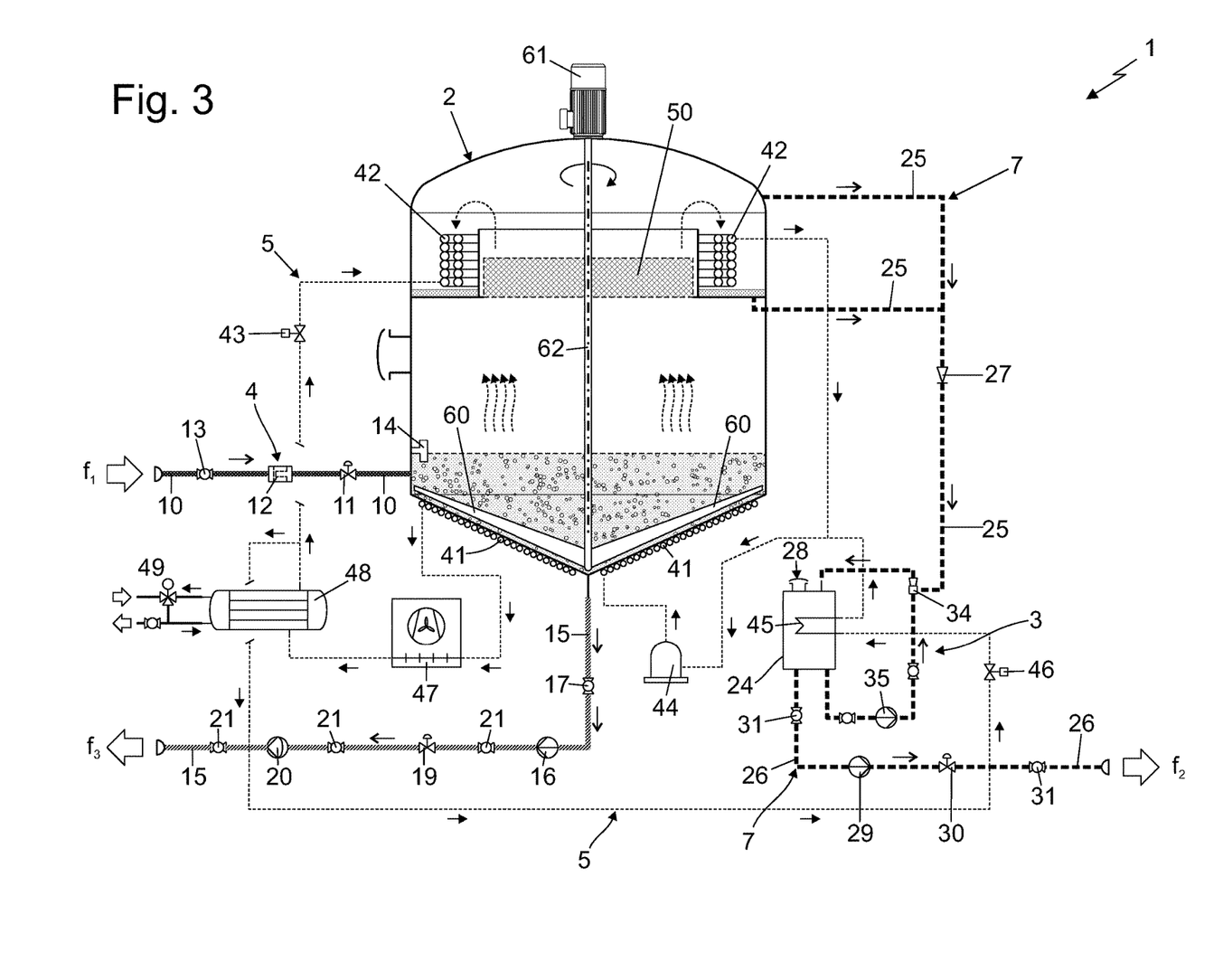
FIG. 3 is a schematic view of an embodiment variation of the sewage treatment machine illustrated in the previous figures.

Additionally, with reference to FIG. 3, in an alternative embodiment the high-pressure heat-exchanger 41 of the heat-pump evaporator/condenser assembly 5 is located adjacent to, and more conveniently in contact with the bottom of container 2, preferably outside of the container, so as to transfer heat directly to the liquid present on the bottom of the container 2.

The low-pressure heat-exchanger 42, in turn, is preferably entirely placed/housed inside the container 2, and the top of container 2 is preferably structured to temporarily collect the condensed liquid dripping from the heat-exchanger 42.

Furthermore, in this embodiment, the sewage treatment machine 1 is preferably provided with a rotatable stirring member 60 which is located inside the container/reactor 2, close to the bottom of the container, with the capability of rotating about a given rotation axis A preferably substantially coinciding with the longitudinal axis of the container 2; and with a preferably electrically-operated, motor assembly 61 which is preferably located outside of container 2, and is adapted to drive into rotation the stirring member 60 about axis A.

Preferably, the rotatable stirring member 60 is moreover structured so as to be able to scrape the inner surface of the container 2 during rotation about axis A.

In more detail, the rotatable stirring member 60 is preferably provided with a series of radial blades that are angularly distributed around axis A and extend skimming the inner surface of the container 2.

Preferably, the rotatable stirring member 60 is moreover fixed/fitted in rigid manner to the end of a support shaft 62 that protrudes inside the container 2 starting from the top, extends cantilevered inside the container 2 coaxial to axis A, and is driven into rotation by the motor assembly 61.

The motor assembly 61, in turn, basically consists of an electric gearmotor which is located on the top of container 2, preferably outside of the latter, and is mechanically coupled to the support shaft 62 so as to be able to drive into rotation the support shaft 62 and what integral thereto about axis A.

Preferably, the electronic control device 9 is also adapted to command the motor assembly 61 based on some operating parameters of the machine 1.

Even in this embodiment, the refrigerant fluid contained into the heat-pump evaporator/condenser assembly 5 comprises one or more gases of the family of the hydrofluoroolefins in a percentage greater than 3%, and more conveniently in a percentage greater than 30% or, even, greater than 50%.

In an alternative and non-shown embodiment, finally, the container/reactor 2 may consist of a substantially cylindrical and oblong in shape, large watertight closed vessel which preferably extends substantially horizontally.

Additionally, the rotatable stirring member may consist of a screw which is inserted in axially rotatable manner inside the container/reactor 2, substantially coaxial or anyway parallel to the longitudinal axis of the container/reactor 2, and is optionally dimensioned so as to be able to scrape the bottom of the container/reactor 2 during the rotation about its longitudinal axis.

Clearly, the screw is driven into rotation by a preferably electrically-operated, motor assembly which is preferably located outside of the container/reactor 2.

The invention claimed is:

1. A sewage treatment machine, comprising:
   a closed container into which a liquid to be treated is brought to boil;
   a vacuum-generating apparatus, which is adapted to maintain an inside of the closed container at a given pressure having a value lower than an environmental and/or external pressure;
   a supply line for the liquid to be treated, which is adapted to channel the liquid to be treated to the inside of the closed container;
   a heat-pump assembly, which is connected to the closed container so as to be able to transfer heat to the liquid present on a bottom of the closed container thus to bring said liquid to boil, and simultaneously remove heat from the vapours that reach a top of the closed container thus to condense the vapour and obtain a distilled liquid, wherein said heat-pump assembly contains a refrigerant fluid including one or more gases of the family of the hydro-fluoroolefins in a percentage greater than 3%;
   a first drain line that branches off and/or departs from a bottom part of the closed container and is adapted to channel, outside of the closed container, the liquid that accumulates and/or stagnates on the bottom of the closed container; and a second drain line that branches off and/or departs from the upper part of the closed container and is adapted to channel, outside of the closed container, the vapours that form inside the closed container and/or the distilled liquid resulting from condensation of said vapours, wherein said second drain line comprises a tank adapted to contain the vapour and/or the distilled liquid arriving from the closed container, and wherein said heat-pump assembly additionally comprises a third heat-exchanger which is located inside the tank of the second drain line, so as to be able to cool down the distilled liquid and/or vapour located inside the tank.

2. The sewage treatment machine according to claim 1, wherein said refrigerant fluid comprises one or more gases of the family of the hydrofluoroolefins in a percentage greater than 30%.

3. The sewage treatment machine according to claim 2, wherein said refrigerant fluid comprises one or more gases of the family of the hydrofluoroolefins in a percentage greater than 50%.

4. The sewage treatment machine according to claim 3, wherein said refrigerant fluid comprises one or more gases of the family of the hydrofluoroolefins in a percentage greater than 75%.

5. The sewage treatment machine according to claim 1, wherein said refrigerant fluid comprises one or more gases of the family of the hydrofluorocarbons.

6. The sewage treatment machine according to claim 1, wherein said vacuum-generating apparatus is adapted to continuously maintain the pressure inside the closed container at a value lower than 0.8 bar.

7. The sewage treatment machine according to claim 1, wherein said supply line is adapted to control and/or vary the flow rate of the liquid to be treated that enters into the closed container, so as to continuously maintain the level of the liquid inside the closed container around a given value.

8. The sewage treatment machine according to claim 1, wherein said heat-pump assembly comprises a first heat-exchanger adapted to heat up the liquid that stagnates on the bottom of the closed container; a second heat-exchanger adapted to cool down and/or condense the vapour that forms inside the closed container; and a first expansion member which is interposed between the first and the second heat-exchanger and is adapted to cause the rapid expansion of the refrigerant fluid directed towards the second heat-exchanger.

9. The sewage treatment machine according to claim 8, wherein said first heat-exchanger is located along a recirculation pipe of said first drain line, or adjacent to the bottom of the closed container.

10. The sewage treatment machine according to claim 8, wherein said second heat-exchanger is located at least partially inside the closed container, or along said second drain line.

11. The sewage treatment machine according to claim 1, wherein said third heat-exchanger is connected in parallel to the second heat-exchanger, and the heat-pump assembly additionally includes a second expansion member that is interposed between the first and the third heat-exchanger and is adapted to cause the rapid expansion of the refrigerant fluid directed towards the third heat-exchanger.

12. The sewage treatment machine according to claim 1, further comprising: a rotatable stirring member which is located inside the closed container, close to the bottom of the container, with the capability of rotating about a given rotation axis, and a motor assembly which is adapted to drive into rotation the stirring member about said rotation axis; the stirring member being structured to scrape the inner surface of the closed container during rotation about said rotation axis.

13. The sewage treatment machine according to claim 1, further comprising a separator and/or demister filter which is located inside said closed container, beneath the entrance of the second drain line, and is adapted to prevent any drops of liquid dragged upwards by the current of the vapour, from reaching the second drain line.

14. The sewage treatment machine according to claim 1, further comprising a rigid supporting framework adapted to stably resting on the ground; said closed container, said vacuum-generating apparatus, said supply line, said heat-pump assembly, said first drain line and said second drain line being placed on the rigid supporting framework so as to form an easily transportable single block.

* * * * *